US011081012B2

(12) United States Patent
Figlar et al.

(10) Patent No.: US 11,081,012 B2
(45) Date of Patent: Aug. 3, 2021

(54) ELECTRONIC DEVICE AND METHOD FOR OPTIMIZING VERTICAL PROFILE FOR CRUISE PHASE OF FLIGHT

(71) Applicant: The Boeing Company, Chicago, IL (US)

(72) Inventors: Bastian Figlar, Munich (DE); David Garrido-Lopez, Tres Cantos (ES); Johan L. De Prins, Molenstede (BE)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 16/159,749

(22) Filed: Oct. 15, 2018

(65) Prior Publication Data

US 2020/0118448 A1 Apr. 16, 2020

(51) Int. Cl.
*G08G 5/00* (2006.01)
*G01C 23/00* (2006.01)
*G05D 1/04* (2006.01)

(52) U.S. Cl.
CPC .......... *G08G 5/0052* (2013.01); *G01C 23/005* (2013.01); *G05D 1/042* (2013.01); *G08G 5/0034* (2013.01); *G08G 5/0091* (2013.01)

(58) Field of Classification Search
None
See application file for complete search history.

(56) References Cited

U.S. PATENT DOCUMENTS

| 6,148,259 | A | * | 11/2000 | Hagelauer | G05D 1/0005 |
| | | | | | 701/122 |
| 2011/0208374 | A1 | * | 8/2011 | Jayathirtha | G05D 1/0676 |
| | | | | | 701/5 |
| 2014/0244077 | A1 | | 8/2014 | Laso-Leon et al. | |
| 2015/0371544 | A1 | * | 12/2015 | Mere | G08G 5/0039 |
| | | | | | 701/3 |
| 2019/0311634 | A1 | * | 10/2019 | Lax | G08G 5/0039 |

OTHER PUBLICATIONS

Extended European Search Report dated Feb. 27, 2020, in European Patent Application No. 19203269.6 (European counterpart of the instant U.S. patent application).

* cited by examiner

*Primary Examiner* — Krishnan Ramesh
(74) *Attorney, Agent, or Firm* — Ostrager Chong Flaherty & Broitman P.C.

(57) ABSTRACT

Electronic devices and methods for optimizing the vertical profile to be flown by an aircraft during the cruise phase of a flight. Based on continuously updated information about the aircraft's weight and the atmospheric wind and temperature, the method provides an optimal sequence of climbs and/or descents along the flight path during the cruise phase. Following the step climb/descent profile proposed by the method results in the most cost-optimal flight (if a cost index was selected) or in the most fuel-efficient flight (if the long-range cruise mode was selected). The method may be implemented in the flight management computer or any other electronic data processing device that can access the required information to perform the calculations.

20 Claims, 15 Drawing Sheets

ELECTRONIC DEVICE AND METHOD FOR OPTIMIZING VERTICAL PROFILE FOR CRUISE PHASE OF FLIGHT

BACKGROUND

This disclosure generally relates to electronic devices and methods for optimizing the cruise profile of an aircraft. The cruise profile for an aircraft includes a cruise speed profile indicating changes in speed along the planned flight path during the cruise phase and a cruise vertical profile indicating changes in altitude along the planned flight path during the cruise phase. In particular, this disclosure relates to electronic devices and methods for optimizing the cruise vertical profile of an aircraft.

Aircraft operators usually intend to minimize the cost of accomplishing a flight from point A to point B. The direct operating costs of a mission are driven by time-related cost and the cost of fuel. These two types of cost are set into relation by the so-called cost index (CI). State-of-the-art flight management computers (FMCs) let the flight crew enter a company calculated CI via the control display unit (CDU). In the economy (ECON) cruise mode, the FMC can then calculate the optimal airspeed along the flight path based on the CI, a given vertical profile during the cruise phase, the aircraft's weight, air temperature and wind speed. In the long-range cruise (LRC) mode, the FMC calculates the airspeed for a given cruise vertical profile, minimizing the trip fuel (not based on the CI). For both cruise regimes, the remaining degree of freedom to further reduce cost is the vertical profile (a.k.a. altitude profile).

A flight management system (FMS) accepts pilot-entered input data that represents a flight plan from the origin airport to the destination airport. A flight plan includes a sequence of waypoints that define the horizontal flight path. The initial cruise altitude is also specified. The FMS typically computes an optimum altitude that is defined as the altitude that minimizes cost (a combination of fuel cost and time cost, to be described below). The optimum altitude depends on aircraft gross weight, speed, wind and air temperature. However, the aircraft is usually constrained to fly at authorized (a.k.a. legal) altitudes in order to maintain traffic separation. The change from one legal altitude to another is referred to as a "step climb" or a "step descent". A step climb in aviation is a series of altitude gains that improve fuel economy by moving into thinner air as the gross weight of an aircraft decreases. In general, as fuel is burned off and the aircraft loses weight, the optimum cruise altitude (the altitude that minimizes cost of flight) increases. For long flights, points at which to initiate a step climb to a new cruise altitude are also specified.

The prior art solved the problem of finding a cost-optimized or fuel-optimized vertical profile for the cruise phase in various ways. These techniques include online solutions performed by the FMC and offline solutions performed on the ground (outside the FMC). The disadvantages of FMC-based functions include the following: (a) the vertical profile found does not necessarily result in a global minimum of cost; and (b) favorable descents are not accounted for. The disadvantages of offline/ground-based functions include the following: (a) most current wind and temperature predictions are not taken into account; (b) flight path changes cannot be accounted for; and (c) the vertical profile optimization is static, i.e., cannot be dynamically recalculated during flight.

SUMMARY

The subject matter disclosed in some detail below is directed to electronic devices and methods for advising the pilot and/or auto-pilot regarding the optimal vertical profile to be flown during the cruise phase of a flight. Based on continuously updated information about the aircraft's weight and the atmospheric wind and temperature, the method in accordance with one embodiment provides an optimal sequence of step climbs and/or descents along the flight path while in the cruise phase. Following the step climb/descent profile proposed herein results in the most cost-optimal flight (if a cost index was selected) or in the most fuel-efficient flight (if the long-range cruise mode was selected). The method may be implemented in the flight management computer or any other electronic data processing device that can access the required information to perform the calculations.

The methodology disclosed herein solves the problem of finding a cost-optimized or fuel-optimized vertical profile for the cruise phase of an aircraft flight. The resulting optimal vertical profile will depend on: selected cruise regime (LRC, ECON CI or manually selected cruise Mach), legally available flight levels, aircraft weight (changing during the flight), atmospheric temperature profile (changing geographically), and wind/altitude profile (changing geographically).

The methodology disclosed herein involves a new function which may reside in the FMC or any other electronic data processing device that can access the required information to perform the calculations. The method includes the following steps: (a) finding a complete sequence of altitude step locations along the flight path for the cruise portion of the flight, representing the global minimum of cost (in ECON CI mode) or trip fuel (in LRC mode); and (b) dynamically re-calculating the sequence of step climbs ahead of the aircraft during cruise. The method takes into account the up-to-date route data, best available aircraft weight estimates, and best available wind and temperature predictions (including actual wind/temperature and blended wind/temperature). The method takes "in-cruise descents" into account (depending on the pilot's or airline's preferences).

Implementation of the above-described new function in the FMC requires a computationally efficient way of performing the optimization. The method described in some detail below drastically reduces the number of potential step locations (meaning locations along the flight path at which an altitude change is assessed), without adversely impacting the chance to find a vertical profile resulting in the global cost minimum. Since the available search space for cruise altitudes is limited to legally available flight levels (usually separated by 2000 ft), the optimization problem becomes very discrete. Combining the discretized altitudes with a small number of potential step locations results in a sparse search grid for which the optimal solution can be found using very efficient state-of-the-art algorithms (e.g., graph theory).

Although various embodiments of electronic devices and methods for optimizing the vertical profile to be flown by an aircraft during the cruise phase will be described in some detail below, one or more of those embodiments may be characterized by one or more of the following aspects.

One aspect of the subject matter disclosed in detail below is a method for optimizing the vertical profile to be flown by an aircraft during a cruise phase of a flight, comprising: determining all potentially relevant step locations along potential cruise flight paths of the aircraft; generating digital data representing a weighted graph based on the cost of all level segments and step segments along the potential cruise flight paths; solving a cruise optimization problem by applying graph theory to the weighted graph; outputting step locations and altitudes of an optimized vertical profile resulting from solving the cruise optimization problem; generating a predicted trajectory along a route based on the step locations and altitudes of the optimized vertical profile; displaying at least a portion of the optimized vertical profile corresponding to a portion of the route on a cockpit graphical display system; and controlling the aircraft to fly in accordance with a portion of the predicted trajectory.

In accordance with one proposed implementation of the method described in the immediately preceding paragraph, step (b) comprises: summing the cost of all level segments at each flight level between intersections; and for each intersection, calculating the cost to climb or descend between the two flight levels of the respective intersecting cost curves based on an aircraft performance model, the calculating comprising correcting the cost by subtracting a part of the cost for a level segment that is not flown, which part of the cost is proportional to a distance traveled during climbing or descending.

Another aspect of the subject matter disclosed in detail below is an electronic device for optimizing the vertical profile to be flown by an aircraft during a cruise phase of a flight, comprising a computer system configured to perform the following operations: (a) determining all potentially relevant step locations along potential cruise flight paths of the aircraft; (b) generating digital data representing a weighted graph based on the cost of all level segments and step segments along the potential cruise flight paths; (c) solving a cruise optimization problem by applying graph theory to the weighted graph; (d) outputting step locations and altitudes of an optimized vertical profile resulting from solving the cruise optimization problem; and (e) generating a predicted trajectory to be flown along a route by the aircraft based on the step locations and altitudes of the optimized vertical profile.

A further aspect of the subject matter disclosed in detail below is a system for optimizing the vertical profile to be flown by an aircraft during a cruise phase of a flight, comprising a cockpit graphical display system and a computer system configured to perform operations (a) through (e) set forth in the immediately preceding paragraph and controlling the cockpit graphical display system to display at least a portion of the optimized vertical profile corresponding to a portion of the route.

Other aspects of electronic devices and methods for optimizing the vertical profile to be flown by an aircraft during the cruise phase are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of electronic devices and methods for optimizing the vertical profile to be flown by an aircraft during the cruise phase are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A flight management system (FMS) onboard an aircraft is a specialized computer system that automates a wide variety of in-flight tasks. A primary function of a FMS is in-flight management of the flight plan. Using various sensors to determine the aircraft's position and an autopilot system, the FMS can guide the aircraft in accordance with the flight plan. Typically an FMS comprises a navigation database that contains the elements from which the flight plan is constructed. Given the flight plan and the aircraft's position, the FMS calculates the course to follow. The pilot can follow this course manually or the autopilot can be set to follow the course.

The flight plan includes a vertical trajectory, a lateral trajectory, time, and a speed schedule to be followed by the aircraft with respective tolerances, enabling the aircraft to reach its destination. The calculations of the flight plans are based on the characteristics of the aircraft, on the data supplied by the crew and on the environment of the system. The positioning and guidance functions then collaborate in order to enable the aircraft to remain on the trajectories defined by the FMS. The trajectories to be followed are constructed from a succession of "waypoints" associated with various flight points, such as altitude, speed, time, modes, heading, and other points. The term "waypoint" encompasses any point of interest where the point is defined using two, three or four dimensions. A trajectory is constructed from a sequence of segments and curves linking the waypoints in pairs from the departure point to the destination point. A segment or series of segments may be constrained by one or more economic constraints (e.g., time, fuel, and/or cost or a combination thereof). The speed schedule represents the speed and speed mode that the aircraft should maintain over time as it flies along the flight trajectory.

Figure 1:
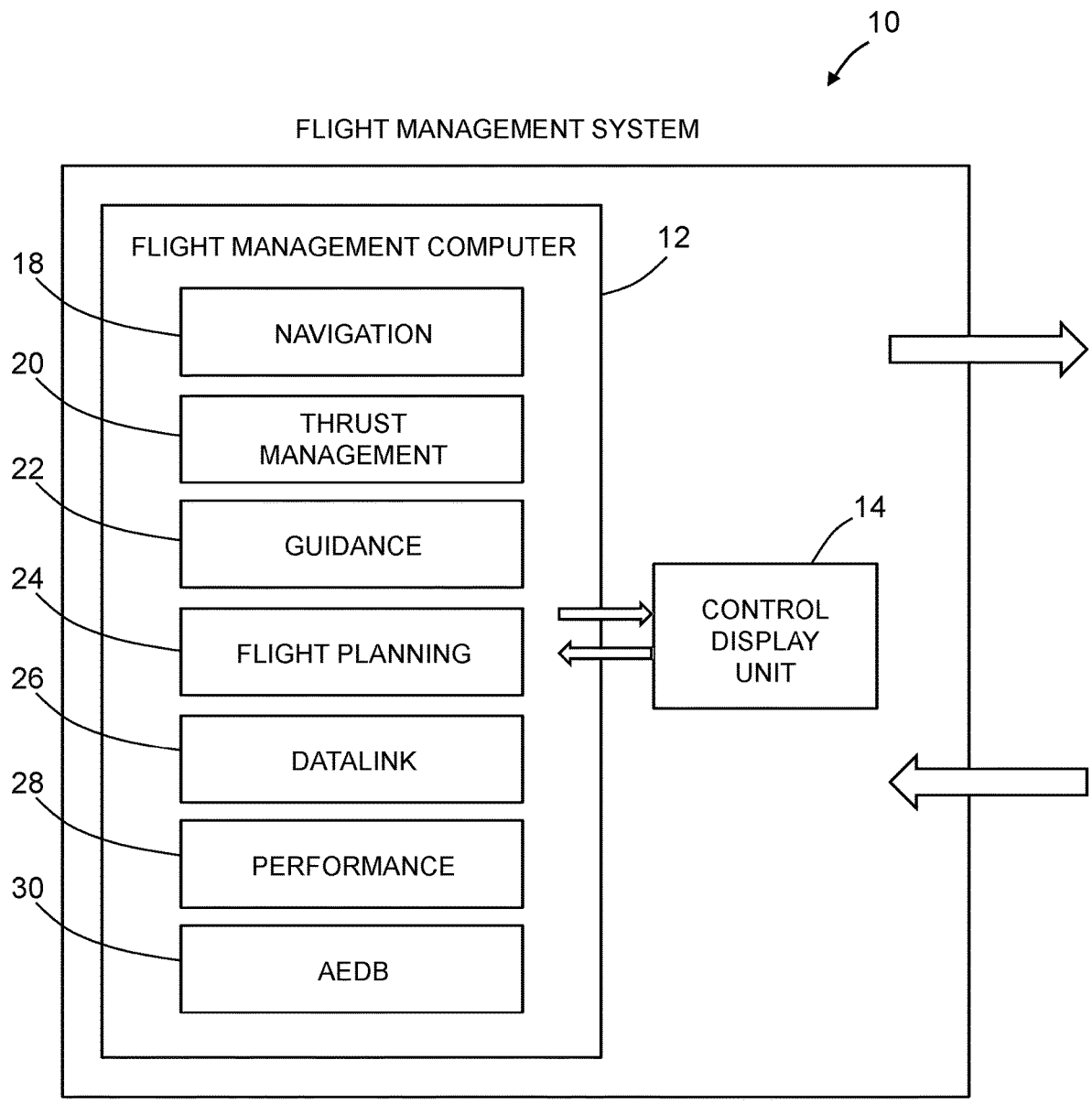
FIG. 1 is a block diagram showing an overall architecture of a typical flight management system.

FIG. 1 is a block diagram showing an overall architecture of a typical flight management system 10 of a type comprising one or more flight management computers 12 and one or more control display units 14. Only one flight management computer 12 (hereinafter "FMC 12") and one control display unit 14 (hereinafter "CDU 14) are depicted in FIG. 1. The CDUs are the primary interface between the FMCs and the pilots.

The FMC software may reside on respective core processors in respective airplane information management system cabinets. The FMC software may comprise the following: a flight management function, a navigation function 18, a thrust management function 20, and a baseline performance database 30 (for example, an aero/engine database (AEDB) containing aerodynamic and propulsion data). The flight management function provides guidance 22, flight planning 24, datalink 26, a performance management function 28, CDU interfaces, an interface to the baseline performance database 30, and other functionalities. The navigation function provides sensor selection (inertial, radio, satellite), position solution determination and other functionalities. The navigation function computes airplane position, velocity, track angle and other airplane parameters, collectively termed airplane states, to support FMC functions such as flight planning, guidance, and display.

The flight management system 10 integrates information from an air data and inertial reference system, navigation sensors, engine and fuel sensors, and other airplane systems (not shown in FIG. 1), along with internal databases and crew-entered data to perform the multiple functions. The flight management computer may contain a navigation database (not shown in FIG. 1) and the baseline performance database 30.

For the performance management function 28, the flight management system 10 has various internal algorithms that utilize aerodynamic and propulsion performance data stored in the baseline performance database 30 to compute predicted flight profile and the associated trip prediction parameters such as estimated time of arrival and predicted fuel consumption quantity. The performance management function 28 uses aerodynamic and propulsion models and optimization algorithms to generate a full flight regime vertical profile consistent with the performance mode selected and within flight plan constraints imposed by air traffic control. Inputs to the performance management function 28 include fuel flow, total fuel, flap position, engine data and limits, altitude, airspeed, Mach number, air temperature, vertical speed, progress along the flight path and pilot inputs from the CDU 14. The outputs are target values of Mach number, calibrated airspeed and thrust for optimum control of the airplane, and advisory data to the crew.

Various performance modes for each flight phase, such as economy climb, economy cruise and long-range cruise, may be selected by the pilot through the CDU 14. Multiple performance modes may be specified for the cruise flight phase. The default mode is an economy profile with speed limited. Economy profiles are computed to optimize fuel or time costs as governed by a cost index factor.

The aerodynamic and propulsion models are used to generate an optimum vertical profile for the selected performance modes. If the autothrottle or autopilot is not engaged for automatic control of the performance management function 28, the pilot can manually fly the optimum speed schedule by referring to the CDU 14 and to the airspeed bug on the speed tape.

The baseline performance database 30 contains prestored data for the aerodynamic model of the airplane as well as for the engine performance model and thrust rating model of the engines. The baseline performance database 30 is used by the performance management function 28 to compute real-time parameters such as speed limits and speed targets, and to perform predictive computations such as flight plan predictions. The baseline performance database 30 is also used by the thrust management function 20 to compute thrust limits.

In some cases, the flight planning function 24 may be performed by a flight planning module in the FMC 12 that includes a flight plan/route processor. The flight plan/route processor uses data retrieved from a navigation database to convert (e.g., by decoding and translation) flight plan/route information into a flight plan/route comprising a list of waypoints and associated flight information. The elements of the decoded and translated flight plan/route are stored in fields of a flight object (along with aircraft type and equipage), where they are available for use by the flight plan/route processor and a flight trajectory predictor (also part of the flight planning module). The flight object may reside in a separate processor that manages the flight object.

In accordance with some embodiments, the flight trajectory predictor (which is also a processor) receives the flight object containing a list of waypoints making up a flight plan/route from the flight plan/route processor and then calculates an updated predicted flight trajectory based on that flight plan/route, an original flight trajectory (if available), the aircraft type and how it is equipped, current and/or forecast environmental conditions retrieved from an environmental database, and other information. The trajectory prediction process can start at any point in any phase of flight, and modifies its process methods/components as appropriate to the available aircraft state and flight information. After the application of environmental data, the trajectory predictions are recalculated. The output of the flight trajectory predictor is the predicted trajectory that includes a vertical profile. The predicted trajectory is stored in the flight object. The pilot or autopilot may then fly the aircraft by following the predicted trajectory as closely as possible.

Figure 2:
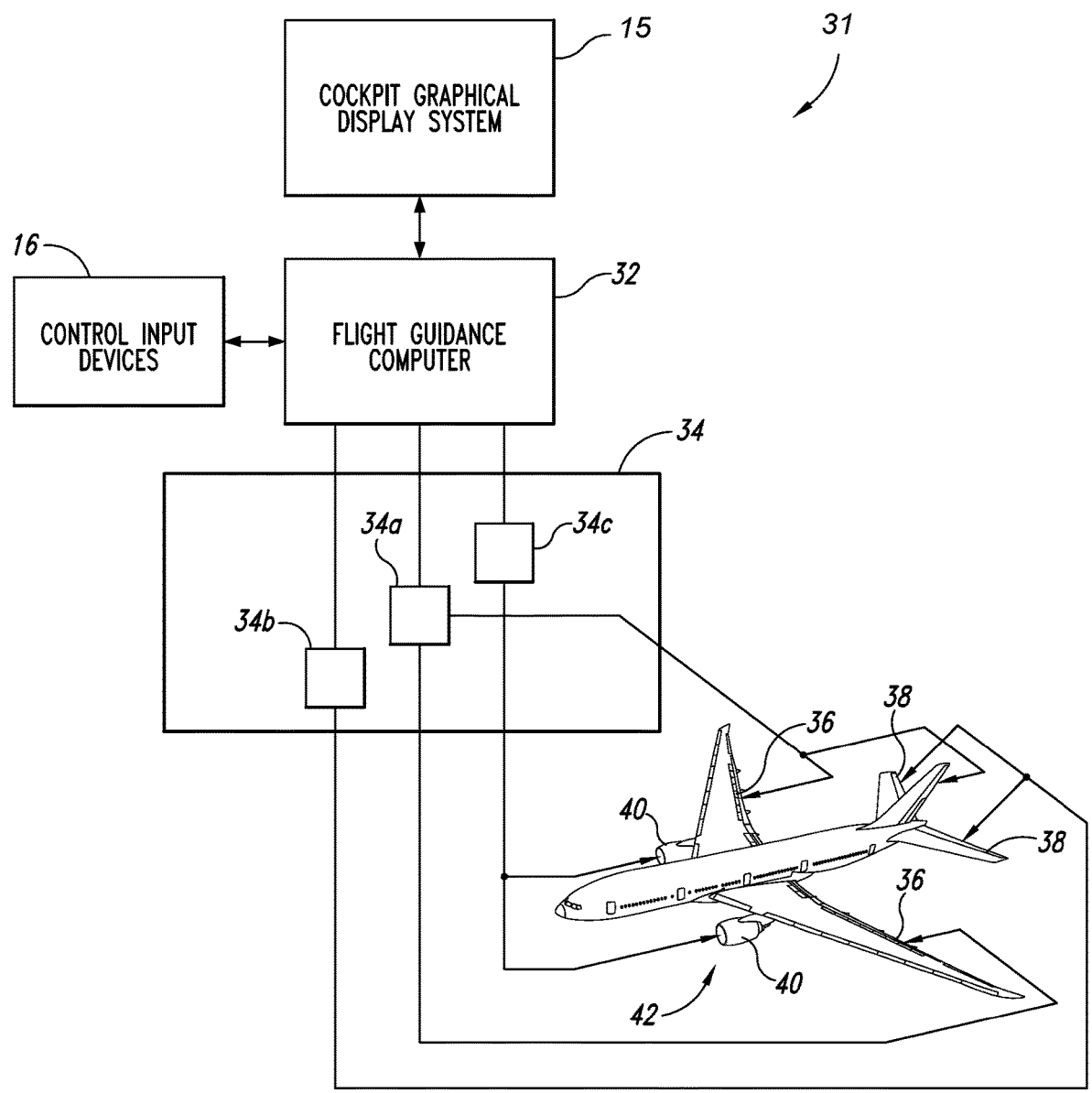
FIG. 2 is a diagram depicting an aircraft flight control architecture including a plurality of control systems.

An aircraft's flight control system provides the capability to stabilize and control the aircraft. Two key elements of a flight control system are the flight guidance system that generates guidance commands and the auto-pilot that executes them. As shown in FIG. 2, a flight guidance system 31 includes display devices such as a cockpit graphical display system 15 or other annunciators (not shown), control input devices 16, a flight guidance computer 32, and a plurality of control systems 34. The flight guidance computer 32 and control systems 34 may be components of an aircraft flight control system that communicates with the flight management system 10 shown in FIG. 1. In one example, the plurality of control systems 34 include a lateral/directional motion (or roll/yaw) control system 34a, a vertical motion (or pitch) control system 34b, and an airspeed (or autothrottle/engine) control system 34c. The lateral/directional control system 34a can be coupled to flight control surfaces 36 affecting lateral and directional control, which are typically ailerons and/or rudders of the aircraft 42. The vertical motion control system 34b can be coupled to pitch control surfaces 38, which are typically the aircraft's elevators. Lastly, the airspeed controller 34c can be coupled to the engines 40 of the aircraft 42 in some path-based modes of operation, and can be coupled to the elevators in some climb and descent modes of operation.

Figure 3:
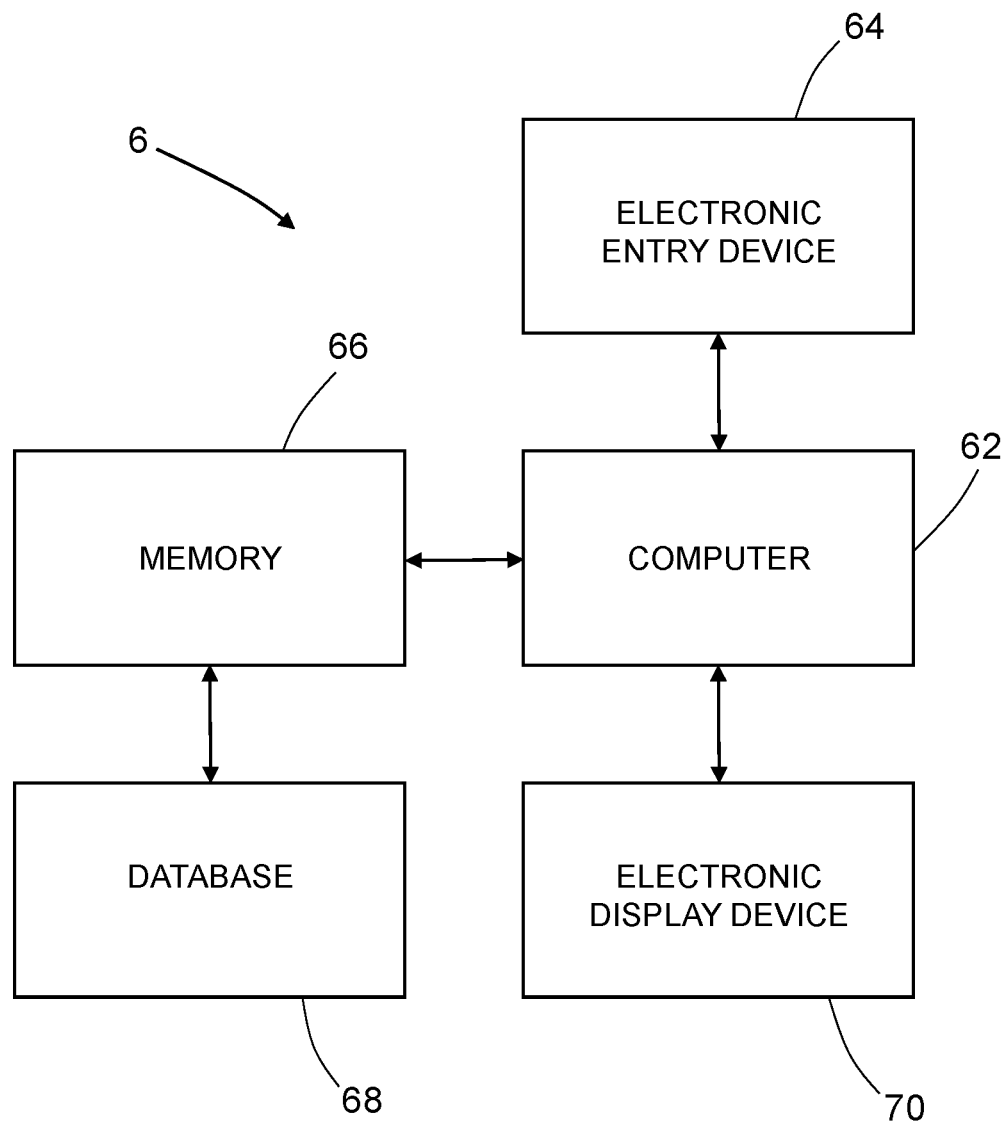
FIG. 3 is a block diagram identifying some components of a flight information display system in accordance with one embodiment.

FIG. 3 is a block diagram identifying some components of a flight information display system 6 which may be configured to display a vertical situation display. The flight information display system may consist of existing components on a flight deck configured (e.g., arranged and programmed) to perform the functions disclosed herein. In the alternative, the flight information display system 6 may be a portable system (e.g., a laptop or tablet computer) that can be carried on and off the aircraft by the flight crew.

The flight information display system 6 depicted in FIG. 3 includes a computer 62, an electronic entry device 64 and an electronic display device 70. The computer 62 is configured to cause the electronic display device 70 to present a vertical situation display that includes symbology representing aircraft step climb/descent segments and level segments for a planned flight path. The electronic entry device 64 may be used for user inputs. The user may also input information into the flight information display system 6 via other aircraft systems. For example, the user may use a flight management computer 12 to input information and preferences into the flight information display system 6. The computer 62 includes a memory 66 (also referred to herein as a "a non-transitory tangible computer-readable storage medium"), which stores a database 68. The database 68 may include information on terrain, airspace, flight routes, flight plans, waypoints, instrument approaches, runways and/or any other information that may be needed by an aircraft flight crew. The computer 62 is programmed to use the information from the database 68 to generate a side view of an aircraft flight plan (e.g., a vertical situation display) on an electronic display device 70. The vertical situation display graphically represents a view of the vertical (altitude) profile of an aircraft 42. When selected by the flight crew, the vertical situation display may, for example, appear at the bottom of a navigation display in the cockpit.

Figure 4:
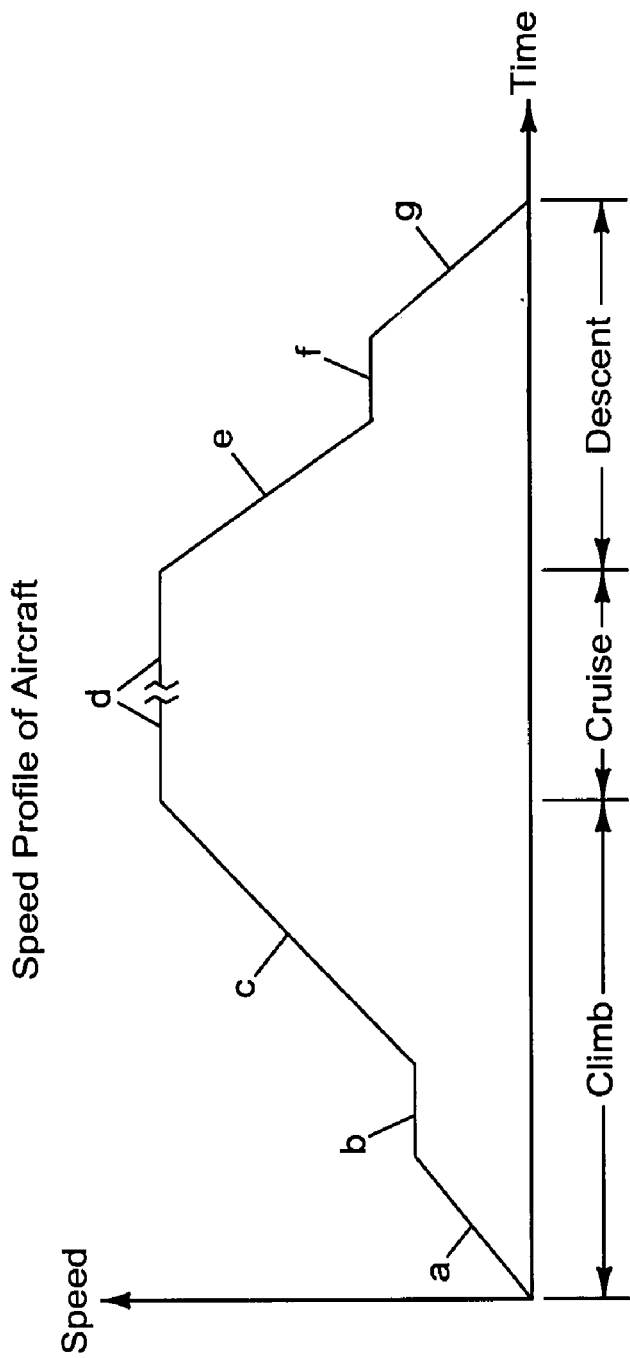
FIG. 4 is a graph representing a simplified preprogrammed speed profile for a flight path of an aircraft.

FIG. 4 is a graph representing a simplified preprogrammed speed profile for a flight path of an aircraft. The flight path includes a climb segment, a cruise segment and a descent segment, where the preprogrammed speed profile increases during the climb segment, levels off at a desired cruise speed, and then decreases during the descent segment. Speed increases during the climb segment and speed decreases during the descent segment may be limited by certain constraint speeds. Such constraint speeds are often set by law for aircraft flying below a certain elevation, such as, for example, a law requiring a plane to fly at 250 knots or less under 10,000 feet. Such a constraint speed would limit the climb speed to 250 knots or less at elevations of 10,000 feet or below during climb and descent segments. Thus, during the climb segment, as illustrated in FIG. 4, the aircraft may accelerate to a speed of 250 knots during portion a, then maintain a constant speed of 250 knots during portion b, until the aircraft reaches 10,000 feet. At that point, the aircraft may begin to accelerate again during portion c of the climb segment. The cruise segment is indicated by portion d in the graph of FIG. 4. During the descent segment, the aircraft may decrease speed during a portion e in order to comply with the constraint speed of 250 knots at 10,000 ft, then maintain the 250 knots for a period of time during portion f of the speed profile, before reducing speed again during portion g, as the aircraft begins final approach.

During the cruise phase of a flight, costs may be reduced by providing information to the pilot and/or auto-pilot regarding the optimal vertical profile. This disclosure proposes a system and method that provides an optimal sequence of step climbs and/or descents along the flight path while in the cruise phase based on continuously updated information about the aircraft's weight and the atmospheric wind and temperature. Following the step climb/descent profile proposed herein results in the most cost-optimal flight (if a cost index was selected) or in the most fuel-efficient flight (if the long-range cruise mode was selected). The method may be implemented in the flight management computer (which option is disclosed in some detail below for the sake of illustration) or any other electronic data processing device that can access the required information to perform the calculations. The proposed methodology solves the problem of finding a cost-optimized or fuel-optimized vertical profile for the cruise phase of an aircraft flight. The resulting optimal vertical profile will depend on: selected cruise regime (LRC, ECON CI or manually selected cruise Mach), legally available flight levels, aircraft weight (changing during the flight), atmospheric temperature profile (changing geographically), and wind/altitude profile (changing geographically).

Figure 5:
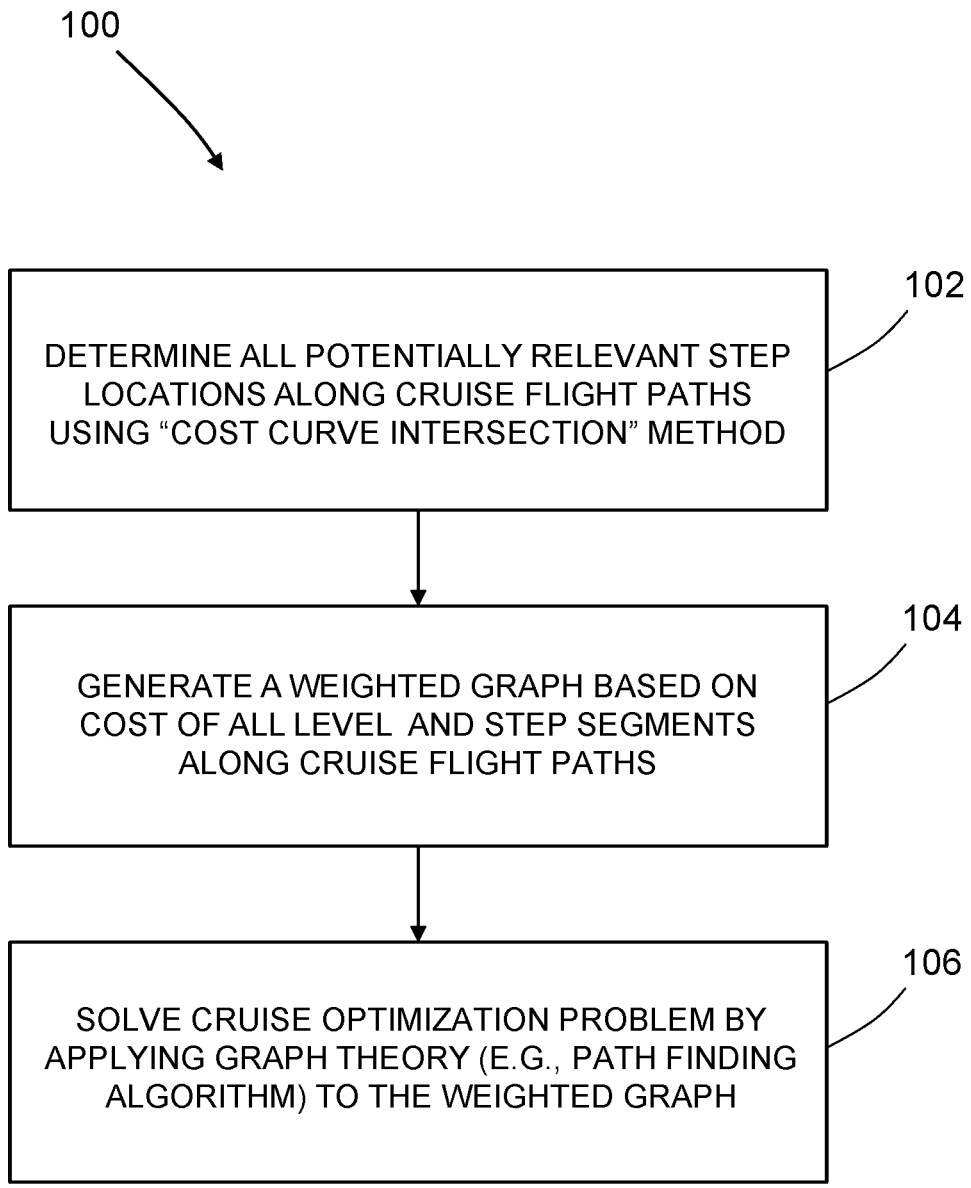
FIG. 5 is a flowchart that provides an overview of the method proposed herein.

FIG. 5 is a flowchart that provides an overview of a computationally efficient method 100 for finding a cruise vertical profile resulting in a global minimum cost or global minimum used fuel. Because of its efficiency, the proposed method is well suited for "online" computation in the FMC 12 as well as for dynamic re-computation based on updated weather and ATC information. The method 100, when viewed at a high level, comprises the following main procedural steps: (a) determine all potentially relevant step locations along cruise flight paths using a "cost curve intersection" method (step 102); (b) generate a weighted graph based on the cost of all level and step segments along potential cruise flight paths (step 104); and (c) solve the cruise optimization problem by applying graph theory (e.g., using a path finding algorithm) to the weighted graph (step 106).

The method 100 solves the problem of finding a cost-optimized or fuel-optimized vertical profile for the cruise phase of an aircraft flight. Step 102 is required to reduce the size of the optimization problem as much as possible, allowing a truly optimal vertical profile to be found in the most efficient way. The vertical search space for the optimization is already very discrete, since only the legally available flight levels can be considered. The flight levels are typically vertically separated by 2,000 ft.

Figure 6:
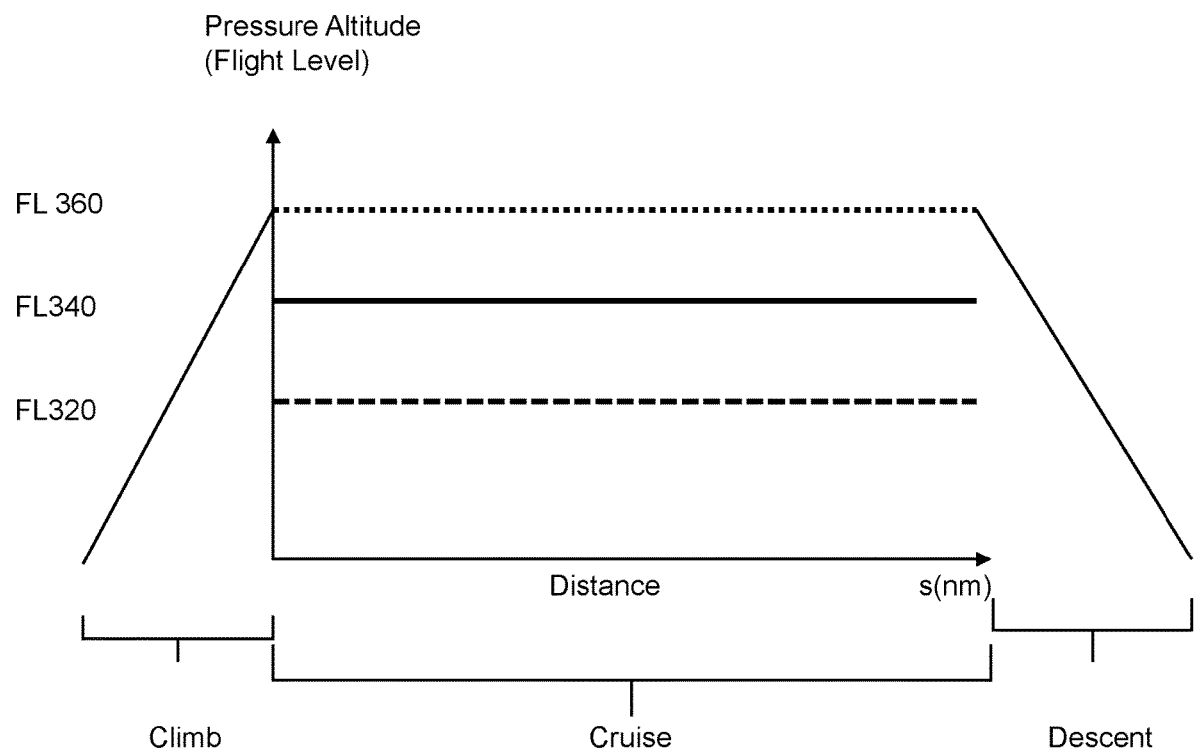
FIG. 6 is a graph showing three legally available flight levels representing a "legally flyable search space" of available cruise altitudes.

FIG. 6 is a graph showing three legally available flight levels representing a "legally flyable search space" of available cruise altitudes for the purpose of illustration. In the example shown in FIG. 6, the legally available flight levels of interest are named Flight Level 320 (for 32,000 ft), Flight Level 340 (for 34,000 ft) and Flight Level 360 (for 36,000 ft).

The method 100 involves a new function which may reside in the FMC 12 or any other electronic data processing device that can access the required information to perform the calculations. The implementation of the new function in the FMC 12 requires a computationally efficient way of performing the optimization. The proposed method 100 laterally discretizes the problem without decreasing the quality of the resulting optimal vertical profile. For this purpose it is proposed to calculate a "cost curve" for every legally available flight-level along the flight path for a given cost index or a long-range cruise condition. A cost curve results from calculating the cost of subsequent short segments along the flight path, assuming stationary/averaged conditions within a segment. The integral of such a cost curve would represent the cost of flying the entire cruise phase of the flight at the respective flight-level. The cost of a segment is calculated based on an aircraft performance database and calculations. More specifically, the calculation of the cost curve of a given flight level is based on the aircraft's weight, airspeed, wind speed and air temperature. The determination of the aircraft's weight is based on logic, explained later, that helps to identify the most cost-optimal vertical profile.

Figure 7:
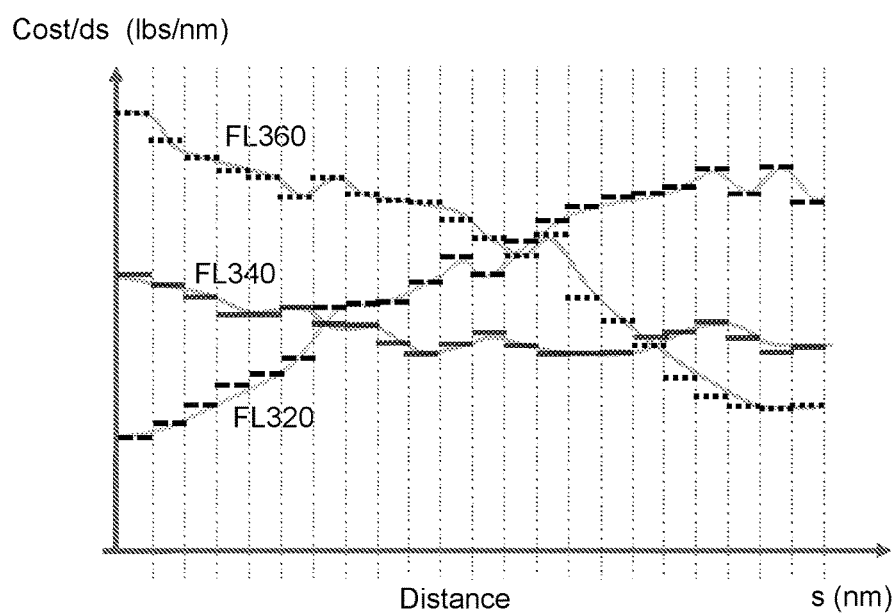
FIG. 7 is a graph of showing exemplary cost curves (cost per unit distance versus distance) for each flight level that is part of the search space shown in FIG. 6, for a company cost index set to X (CI=X).

FIG. 7 is a graph of showing exemplary cost curves (cost per unit distance versus distance) for each flight level that is part of the search space shown in FIG. 6, for a company cost index set to X (CI=X). The short horizontal straight lines (dashed for FL320, solid for FL340 and dotted for FL360) represent respective costs per unit distance for successive short segments along the flight path, which costs per unit distance are assumed to be constant within a segment.

Figure 8:
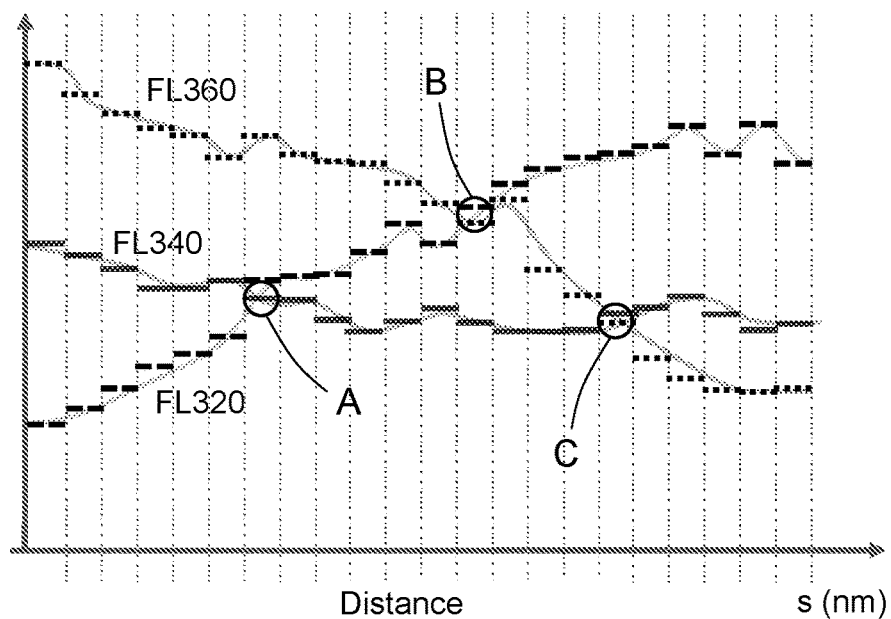
FIG. 8 is a graph showing the same exemplary cost curves shown in FIG. 7, but with intersections identified.

To laterally discretize the optimization problem, all cost curve intersections shown in FIG. 7 are identified as potential locations to climb or descend to another flight level. FIG. 8 is a graph showing the same exemplary cost curves shown in FIG. 7, but with intersections identified (e.g., the intersection A of the cost curves for FL320 and FL340; the intersection B of the cost curves for FL320 and FL360; and the intersection C of the cost curves for FL340 and FL360).

Figure 9:
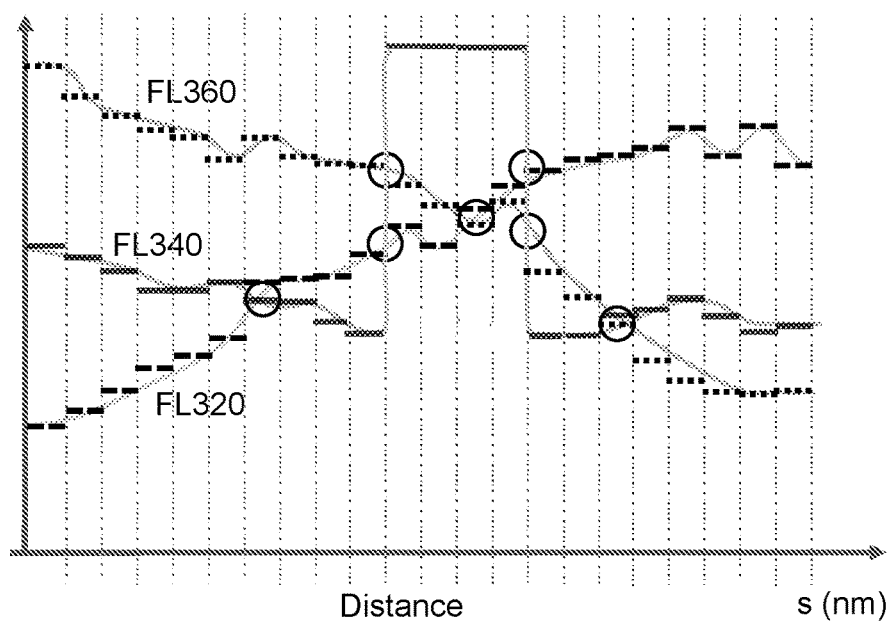
FIG. 9 is a graph showing exemplary cost curves that account for an airspace restriction at flight level FL340.

To allow taking into account an air space restriction or other preference, the cost can be artificially increased. FIG. 9 is a graph showing exemplary cost curves that account for an airspace restriction at flight level FL340, resulting in additional cost curve intersections.

For finding the cost curve intersections that minimize cost for the cruise phase, a special logic needs to be applied for estimating the changing aircraft's weight along the flight path. In general, high flight levels become more cost efficient as the aircraft's weight decreases along the flight path. This means that cruising at a high flight level may be inefficient at the beginning, while becoming more efficient as more and more fuel is burned towards the end of the cruise phase (see, for instance, the cost curve for FL360 in FIG. 8). If the cost curve for the highest flight level was drawn based on the weight history of an aircraft flying the entire path at the highest flight level, the cost curve would decrease rapidly due to the inefficiency that would result from a high rate of fuel consumption for the initial part of the cruise phase. However, this would result in the highest cost curve intersecting the other cost curves too early.

Figure 10:
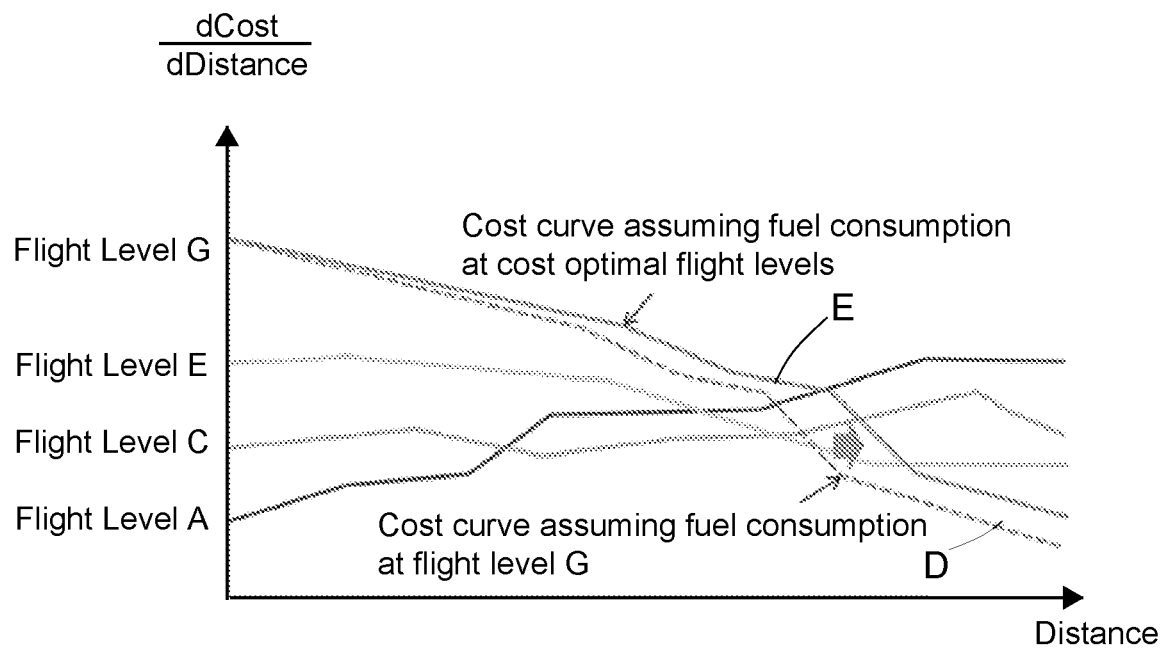
FIG. 10 is a graph showing respective cost curves (cost per unit distance versus distance) for a highest flight level (Flight Level G), the two cost curves being different due to the effect of a weight correction.

Such a cost curve is indicated by the dashed lines in FIG. 10, which is a graph showing respective cost curves (cost per unit distance versus distance) for a highest flight level (Flight Level G). The dashed cost curve D assumes fuel consumption at Flight Level G, while the solid cost curve E assumes fuel consumption at a cost-optimal flight level. The two cost curves D and E are different due to the effect of weight correction.

Figure 11:
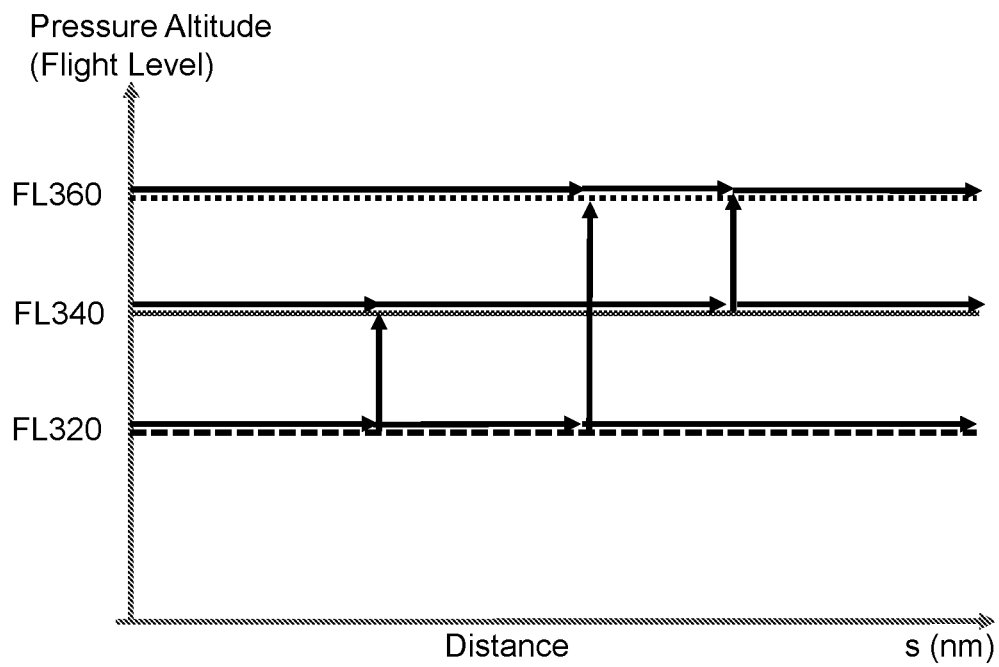
FIG. 11 is a graph showing exemplary potential cruise segments (pressure altitude versus distance) of a discretized search space for the optimization solver disclosed herein.

The new method proposed herein calculates all cost curves in parallel and segment-wise (from left to right), taking into account the rates of fuel consumption of the cost-optimal flight level, to derive the estimated aircraft weight for the cost curve calculation of the next segment. The method of finding the cost curve intersections disclosed herein finally results in a discrete grid that may be efficiently evaluated in an optimization problem. FIG. 11 is a graph showing exemplary potential cruise segments (pressure altitude versus distance) of a discretized search space to be evaluated by the optimization solver disclosed herein.

Figure 12:
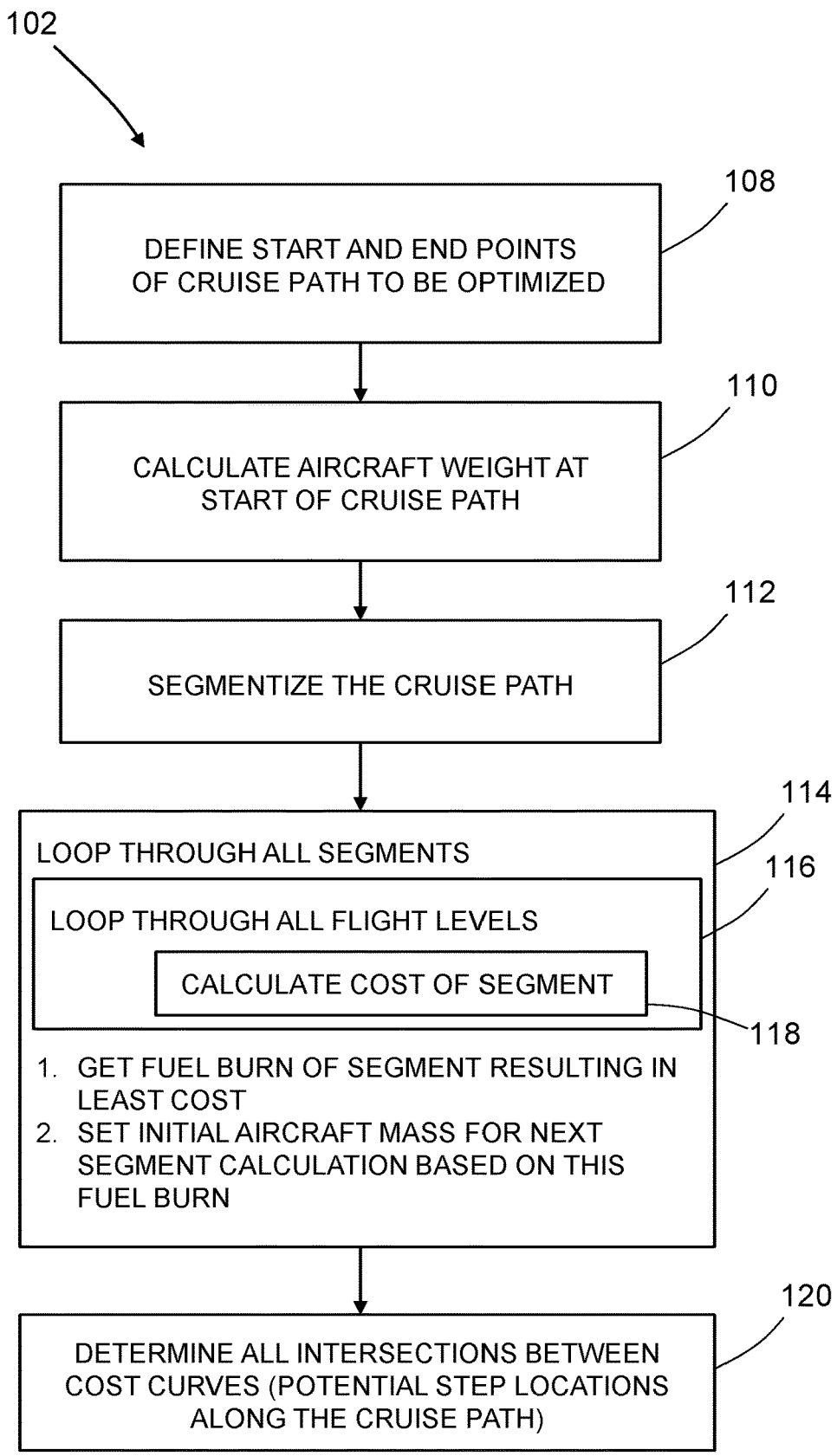
FIG. 12 is a flowchart identifying steps of a method for determining all intersections between cost curves (potential step locations along the cruise flight path).

FIG. 12 is a flowchart identifying steps of a "cost curve intersection" method corresponding to step 102 identified in FIG. 5. The "cost curve intersection" method may be implemented as software configured to enable an FMC 12 (or other electronic data processing device) to determine all intersections between cost curves (potential step locations along the cruise flight path). The "cost-curve intersection" method in accordance with one embodiment includes the following steps.

Figure 13:
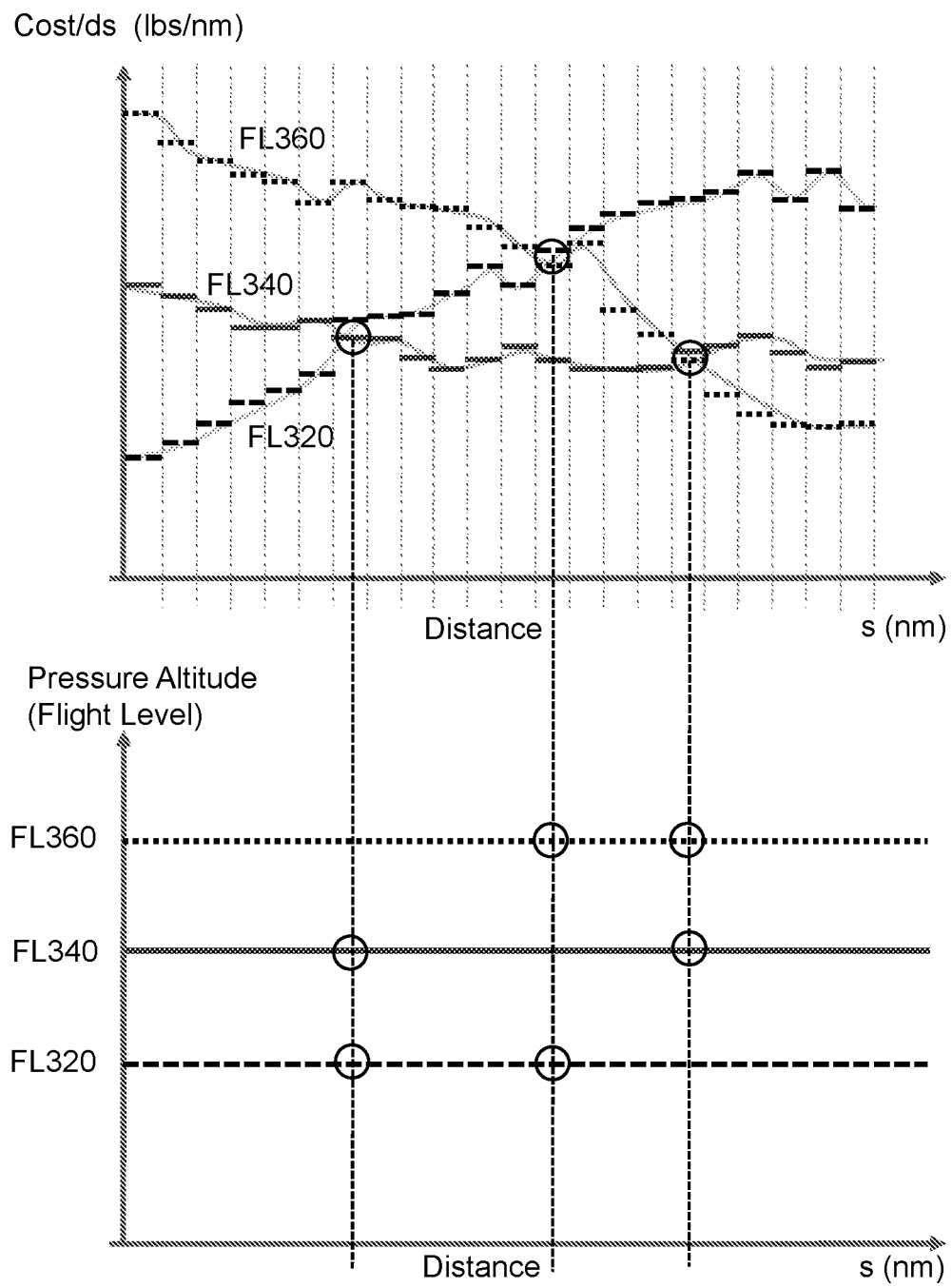
FIG. 13 includes an upper graph identical to the graph in FIG. 8 (which identified three intersections) and a lower graph showing pressure altitude versus distance for the Flight Levels involved in the intersections identified in the upper graph.

First, the start and end points of the cruise flight path to be optimized are defined or selected by a pilot (step 108). Then the FMC 12 calculates the aircraft weight at the start of the defined cruise flight path (step 110). Next the FMC 12 breaks the cruise flight path into segments (step 112). The FMC 12 then loops through all segments (step 114). For each segment, the FMC 12 loops through all flight levels (step 116). The cost of each segment is calculated based on the aircraft performance model stored in a database (step 118), which calculation includes calculating the estimated fuel consumption for each segment. In this case, calculating cost curves comprises calculating an estimated fuel consumption for each potential flight level for one segment and then taking a smallest estimated fuel consumption into account in order to estimate aircraft weight for a cost curve calculation for a next segment. More specifically, the FMC 12 gets the estimated fuel consumption for a segment that would result in least cost and sets the starting aircraft mass for the next segment based on this estimated fuel consumption. For example, for the first segment with multiple candidate flight levels, the fuel consumptions are calculated for each flight level, but the fuel consumption of the flight level that is calculated to burn the least fuel is subtracted from the initial weights of the aircraft for each flight level to obtain the starting weights for those same flight levels for the next segment. The result of these calculations is a set of data representing respective cost curves for a multiplicity of candidate flight levels. The FMC 12 then determines all intersections between those cost curves (indicated by circles in the upper graph in FIG. 13), which intersections are treated as potential step locations along the cruise flight path (step 120 in FIG. 12). The lower graph in FIG. 13 shows pressure altitude versus distance for the flight levels involved in the intersections identified in the upper graph in FIG. 13.

Figure 14:
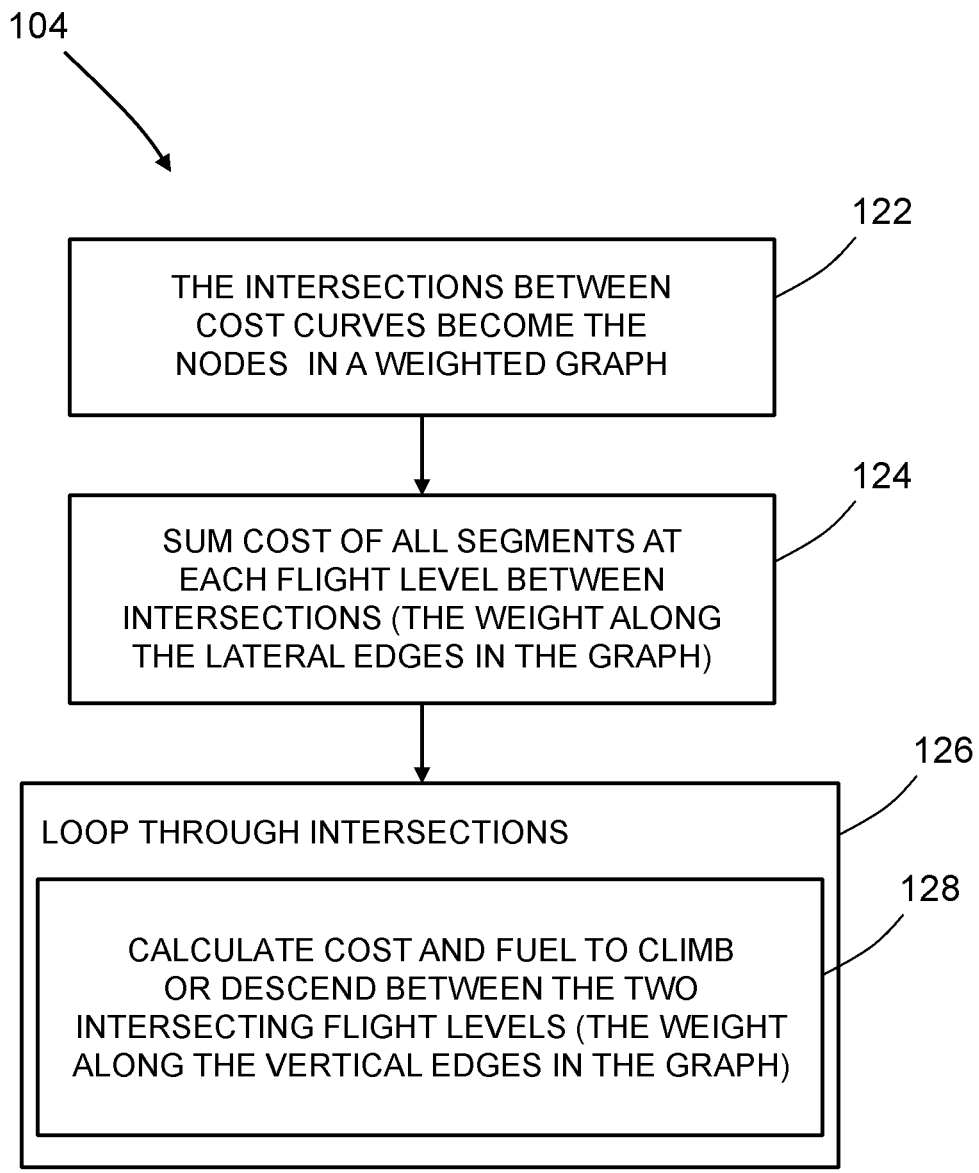
FIG. 14 is a flowchart identifying steps of a method for finding potential step locations and determining cost and step cost by generating a weighted graph in which the intersections between cost curves become nodes in the weighted graph.

FIG. 14 is a flowchart identifying steps of a method for finding potential step locations and determining cost and step cost by generating a weighted graph (step 104 in FIG. 5) in which the intersections between cost curves become nodes in a weighted graph. Each edge of a weighted graph has an associated numerical value, called a weight. In the present application, the weight is a measure of the cost of flying the segment with which the weight is associated. The method for generating digital data representing a weighted graph may be implemented as software configured to enable an FMC 12 (or other electronic data processing device) to generate cost data representing a weighted graph based on the cost of all level and step segments along potential cruise flight path. For example, FIG. 15 is an exemplary weighted graph of cost per unit distance for the intersections depicted in FIG. 13.

The method for generating digital data representing a weighted graph (corresponding to step 104 in FIG. 5) in accordance with one embodiment includes the following steps. The intersections between cost curves (found using the previously described "cost curve intersection" method) become the nodes in a weighted graph (step 122). The FMC 12 sums the cost of all level segments at each flight level between intersections (step 124), which costs are applied as weights along the lateral edges in the weighted graph. For example, the first level segment for FL360 shown in FIG. 15 has a cost weight $Cost_{360.1}$. The FMC 12 then loops through all intersections (step 126). For each node, the FMC 12 calculates the cost to climb or descend between the two flight levels of the respective intersecting cost curves based on the aircraft performance model (step 128). For example, the first step climb segment from FL320 to FL340 shown in FIG. 15 has a cost weight $Cost_{climb(320-340)}$. The cost allocated for the climb and descent edges includes the estimated actual cost to perform those steps reduced by a correction (subtraction of a part) of the cost for the level segment that is not flown, which correction is proportional to the distance it takes to climb/descend. For the graph search (applied in the next stage), it is key that the level cost corrections be accounted for in the vertical edges since the cost of the horizontal edges should be independent of the upstream history of the vertical profile. Thus. the legally available flight levels together with potential step climb/descent locations result in a "mesh" of nodes connected by edges of known cost (cost along the distance at a certain flight level and cost of a step climb (or step descent).

Figure 15:
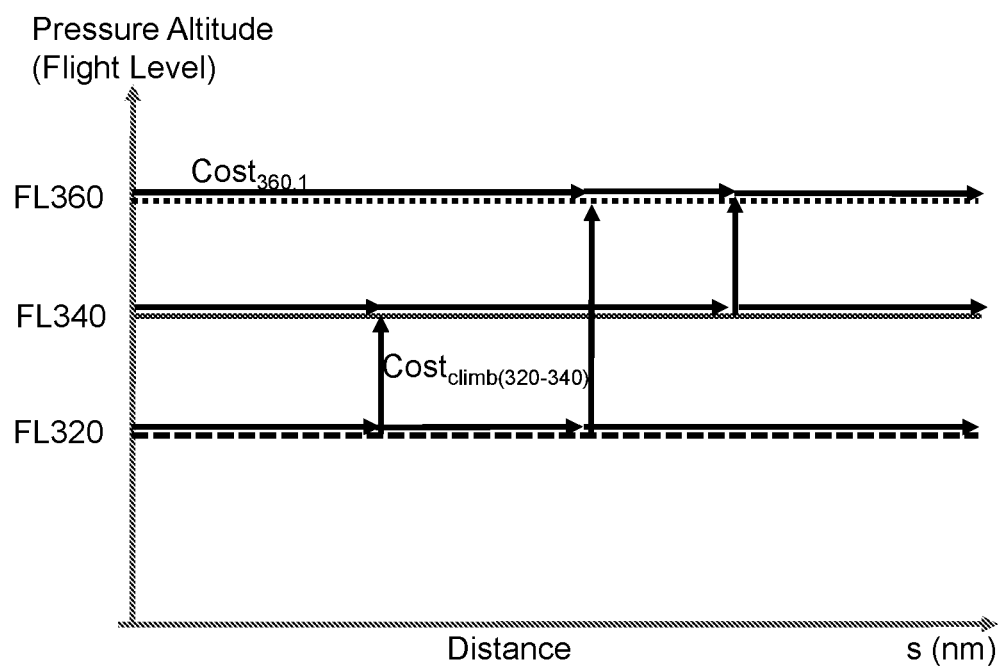
FIG. 15 is a weighted graph of cost per segment for potential cruise segments. Each arrow in the weighted graph represents the cost to either follow a level segment at a certain altitude or to climb/descend from one flight level to another flight level.

FIG. 15 is a weighted graph of cost per segment. Each arrow in the weighted graph represents the cost to either follow a level segment at a certain altitude or to climb/descend from one flight level to another flight level. For each edge between the nodes in the flight levels, cost is determined either based on the cost curves (for level segments) or based on calculated climb or descent cost (for the climb/descent segments). Only climbs and descents that result in lower cost are considered, which drastically reduces the number of options as the FMC 12 processes the data starting from the left side of the weighted graph and proceeding to the right side For each edge between the nodes in the flight levels, cost is determined either based on the cost curves (for level segments) and based on calculated climb or descent cost (for the climb/descent segments).

The cost-optimal step climb/descent profile can now be found by assessing all possible combinations through the mesh (brute force) or by applying an algorithm related to graph theory (like a path finding algorithm) to the problem. In accordance with one embodiment, the cruise optimization problem is solved by applying a path finding algorithm (e.g., Dijkstra's algorithm or the Bellman-Ford algorithm) or similar method from graph theory to find the least costly flight path through the weighted graph (step 106 in FIG. 5). The optimization solver may be implemented as software hosted on the FMC 12 (or other electronic data processing device).

The step climb/descent profile resulting from the above-described method is expected to represent the globally optimized vertical profile within the legally flyable search space. All step climb/descent locations are set at collectively optimized locations along the flight path (without being affected by adverse fitting effects) and the cost of climbs and descents are accounted for by the optimization algorithm, thus eliminating the need for filtering. The proposed method is expected to be a computationally efficient method for finding a global optimum, since the method finds only a very limited but complete number of relevant step climb/descent locations that need to be assessed.

Figure 16:
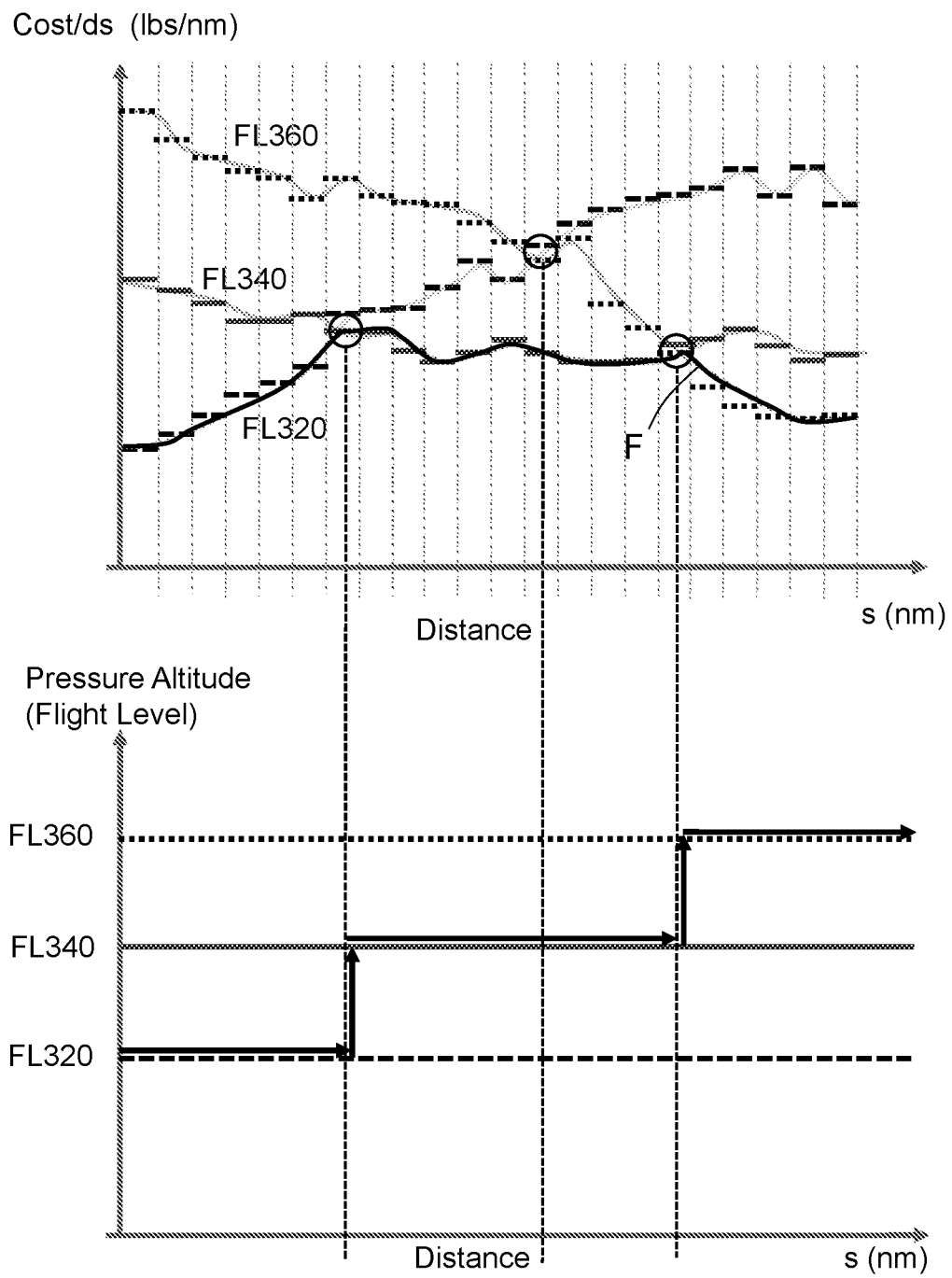
FIG. 16 includes: an upper graph showing the exemplary cost curves shown in FIG. 8 and an additional optimal cost curve (in boldface) derived using a path finding algorithm; and a lower graph showing a cost-optimal vertical profile (indicated by arrows) corresponding to the additional optimal cost curve in the upper graph.

FIG. 16 includes an upper graph showing the exemplary cost curves from FIG. 8 and an additional optimal cost curve F (in boldface) derived using a path finding algorithm as described above. FIG. 16 also includes a lower graph showing a cost-optimal vertical profile (indicated by arrows) corresponding to the additional optimal cost curve F in the upper graph. The vertical arrows indicate step climbs The boldface line in the upper graph of FIG. 16 shows the optimal cost curve F to be followed by changing the flight levels along the cruise flight path as depicted in the lower graph in FIG. 16.

One advantage provided by the above-described method for optimizing a cruise vertical profile is that only the relevant step climb/descent locations are found based on the above-described "cost curve intersections". This limited set of locations supplemented by calculated cost for climbing and descending enable a cost-optimal cruise vertical profile to be found. Additional aspects which simplify the optimization problem include the weight reduction correction described above and the fact that for climb and descent segments, cost corrections are applied taking into account the reduced horizontal distance flown. These features, combined with the cost-curve intersection method, enable the optimization problem to be solved in a very efficient way. The methodology proposed herein results in a globally optimized vertical flight profile. The method of "cost curve intersections" is used to find all relevant locations for potential climbs and descents. In addition, cost estimates for climbs and descents at all locations are taken into account to enable global optimization.

One benefit of the methodology proposed herein is that the optimization problem may be captured in a simplified graph (grid) form (due to the calculation of cost curves, the weight correction and climb/descent corrections). This graph allows for a very efficient search of the optimal path. In addition, the graph can be further simplified by only using nodes that reflect the cost curve intersections. The latter will make it further computationally efficient, but the method already works if one uses an equally segmented m×n graph.

The above-described method will be implemented as software running on the FMC 12 or a similar electronic data processing device that can access the required data to perform the calculations. In accordance with one embodiment, the new function disclosed herein resides in the FMC 12 in the form of an executable algorithm that includes the following steps: (a) finding a complete sequence of altitude step locations during the cruise portion of the flight, representing the global minimum of cost (in ECON CI mode) or trip fuel (in LRC mode); and (b) dynamically re-calculating the sequence of step climbs ahead of the aircraft during cruise. The method takes into account the up-to-date route data, best available aircraft weight estimates, and best available wind and temperature predictions (including actual wind/temperature and blended wind/temperature). The method takes "in-cruise descents" into account (depending on the pilot's or airline's preferences).

Figure 17:
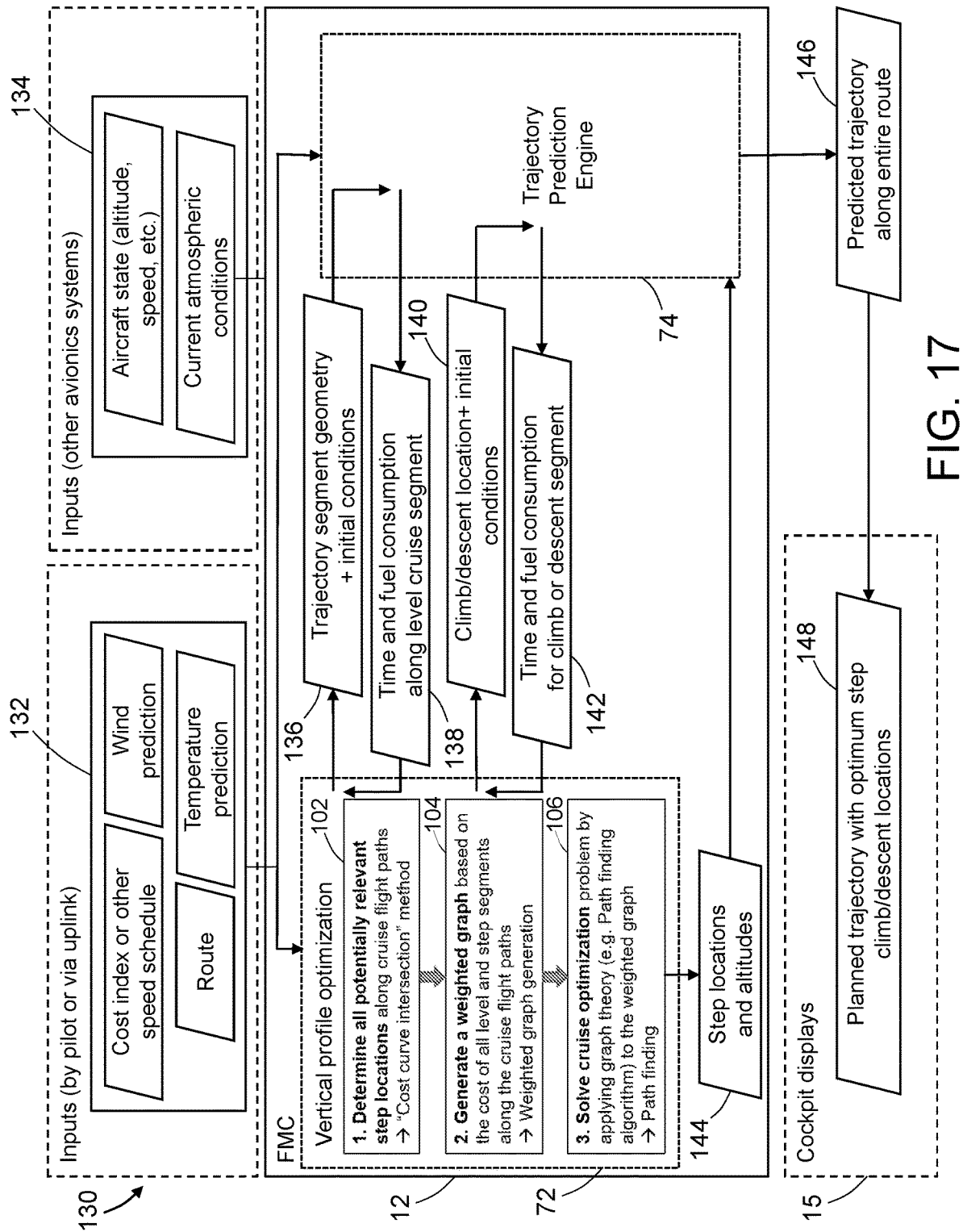
FIG. 17 is a flowchart identifying steps of a method for optimizing the vertical profile of an aircraft during the cruise phase in accordance with one proposed implementation.

FIG. 17 is a flowchart identifying steps of a method 130 for optimizing the vertical profile of an aircraft during the cruise phase in accordance with one proposed implementation inside a FMC 12. The FMC 12 includes a vertical profile optimization software module 72 (hereinafter "vertical profile optimizer 12") and a trajectory prediction engine 74 (also a software module). The vertical profile optimizer 72 executes an algorithm that enables the calculation of an optimized vertical profile with the aid of the trajectory prediction engine 74. The vertical profile optimizer 72 and trajectory prediction engine 74 both receive inputs 132 (e.g., cost index or other speed profile, wind prediction, route, and temperature prediction) by the pilot or via a data uplink and inputs 134 (e.g., aircraft state (altitude, speed, etc.) and current atmospheric conditions) from other avionics systems.

The algorithm executed by the vertical profile optimizer 72 has been previously described with reference to FIGS. 5, 12 and 14. The weighted graph is generated in step 104. The vertical profile optimizer 72 uses the trajectory prediction engine 74 to predict the respective costs of each trajectory segment. The vertical profile optimizer 72 sends the trajectory segment geometry and initial conditions to the trajectory prediction engine 74 (step 136). The trajectory prediction engine 74 computes the time and fuel consumption for each level segment of the cruise phase and sends that information to the vertical profile optimizer 72 (step 138). The vertical profile optimizer 72 also sends the climb/descent locations and initial conditions to the trajectory prediction engine 74 (step 140). The trajectory prediction engine 74 computes the time and fuel consumption for each climb or descent segment of the cruise phase and sends that information to the vertical profile optimizer 72 (step 142). The vertical profile optimizer 72 uses the information received from the trajectory prediction engine 74 to generate and store digital data representing the weighted graph (step 104). The vertical profile optimizer 72 then solves the cruise optimization problem by applying a path finding algorithm to the stored digital data representing the weighted graph (step 106). The solution includes the step locations and altitudes 144 for the optimized cruise vertical profile. The vertical profile optimizer 72 passes the resulting step locations and altitudes 144 to the trajectory prediction engine 74, which generates a predicted trajectory along the entire route based on the step climb/descent information (step 146). That predicted trajectory is sent to the cockpit graphical display system 15, which is configured to display the vertical profile of the planned trajectory with optimum step climb/descent locations planned (step 148) in the form of a vertical situation display.

Figure 18:
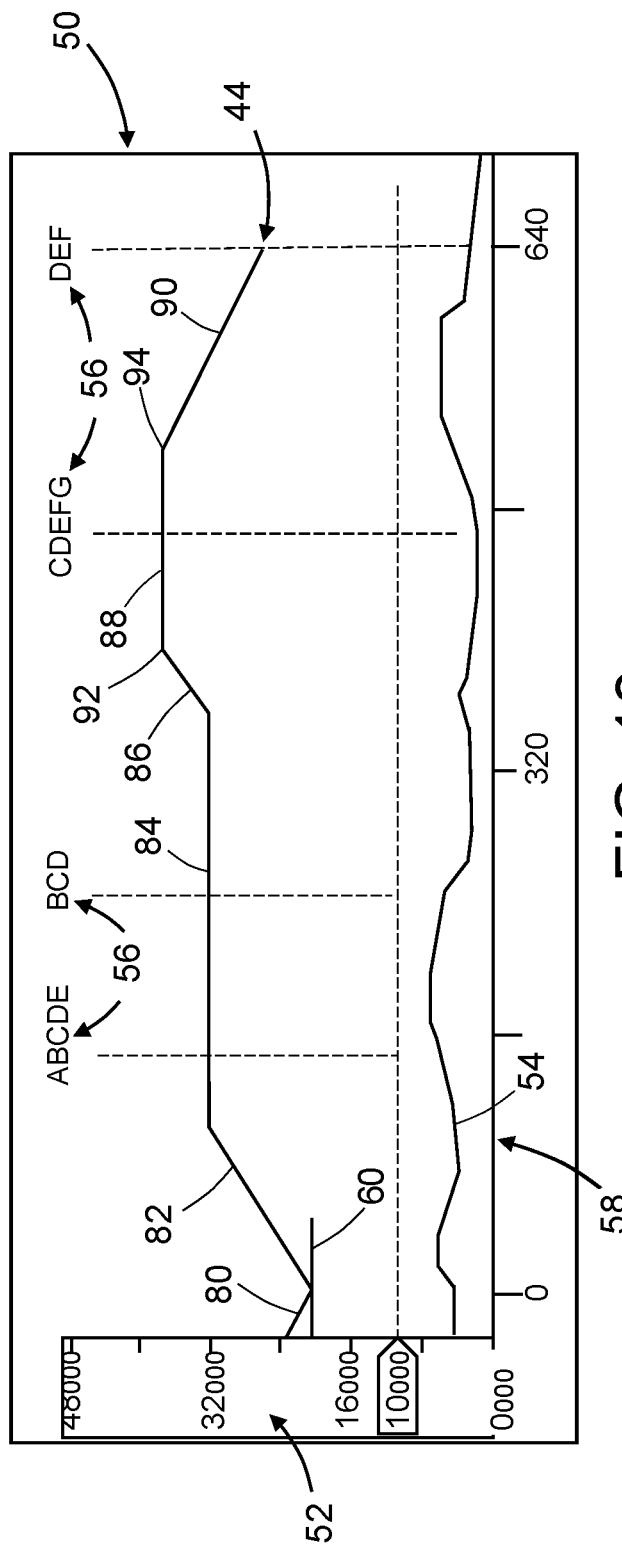
FIG. 18 is a diagram representing an example screenshot of a vertical situation display showing a portion of a vertical profile having step climbs and a step descent.

FIG. 18 is a diagram representing an example screenshot of a vertical situation display 50 showing a portion of an optimized vertical profile climbs determined in accordance with the method proposed herein. Such a vertical situation display 50 may be displayed on the electronic display device 70 by a computer 62 (see FIG. 3) in response to selections inputted by a pilot using the electronic entry device 64. The vertical situation display 50 graphically represents a view of the vertical (altitude) profile of an aircraft. The basic features of this type of vertical situation display 50 include an altitude reference scale 52 and a horizontal distance scale 58, an aircraft symbol 80, a straight line representing a projected flight path vector 60, a terrain depiction 54, navigation aids, and various information selected by the flight crews and flight management computer. FIG. 18 shows the vertical situation display 50 in a path mode of operation.

The exemplary optimized planned flight path 44 depicted in FIG. 18 further includes a chain of connected straight lines representing an optimized planned flight path 44. In the example depicted in FIG. 18, the optimized planned flight path 44 includes the following sequence of flight segments: a first step climb segment 82, a first level segment 84, a second step climb segment 86, a second level segment 88, and a step descent segment 90. The locations of the step climbs/descents are determined using the vertical profile optimization method proposed herein and then displayed on a cockpit display for aiding the pilot to fly the aircraft in accordance with the optimized vertical profile. Various waypoints along the optimized planned flight path 44 are indicated by waypoint name indicators 56. The lines representing the optimized planned flight path 44 depict the planned altitudes as a function of range (distance) from the current location of the aircraft. The terrain depiction 54 is based on the optimized planned flight path 44. The path mode may include display of a top-of-climb point 92, a top-of-descent point 94 and/or any other path-based symbology from the navigation display.

The methodology disclosed herein solves the problem of finding a cost-optimized or fuel-optimized vertical profile for the cruise phase of an aircraft flight. The resulting optimal vertical profile will depend on: selected cruise regime (LRC, ECON CI or manually selected cruise Mach), legally available flight levels, aircraft weight (changing during the flight), atmospheric temperature profile (changing geographically), and wind/vertical profile (changing geographically).

While electronic devices and methods for optimizing the vertical profile to be flown by an aircraft during the cruise phase have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein. The embodiments described in some detail above may include computer-executable instructions, such as routines executed by a programmable computer. Other computer system configurations may be employed, such as a special-purpose computer or a data processor that is specifically programmed, configured, or constructed to perform one or more of the computer-executable instructions described below. Accordingly, the term "computer" as generally used herein refers to any data processor that can be engaged in a cockpit, including computers for cockpit display systems, flight management computers, flight control computers, electronic flight bags, laptops, laptops, or other hand-held devices.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for optimizing the vertical profile to be flown by an aircraft during a cruise phase of a flight, comprising:
   (a) determining all potentially relevant step locations along potential cruise flight paths of the aircraft;
   (b) generating digital data representing a weighted graph, the weighted graph based on the cost of all level segments and step segments along the potential cruise flight paths, which step segments start at the respective step locations;
   (c) determining an optimized vertical profile by applying a path-finding algorithm to the weighted graph;
   (d) outputting step locations and altitudes of the optimized vertical profile;
   (e) generating a predicted trajectory along a route based on the step locations and altitudes of the optimized vertical profile; and
   (f) displaying at least a portion of the optimized vertical profile corresponding to a portion of the route on a cockpit graphical display system,
   wherein step (a) comprises:
   calculating cost curves for segments of all potential flight levels in parallel, the cost curve of each segment based on an aircraft performance model; and
   determining all intersections between the cost curves.

2. The method as recited in claim 1, further comprising controlling the aircraft to fly in accordance with a portion of the predicted trajectory.

3. The method as recited in claim 2, further comprising repeating steps (a) through (e) during flight of the aircraft along the portion of the predicted trajectory to generate an updated predicted trajectory.

4. The method as recited in claim 1, wherein calculating cost curves comprises calculating an estimated fuel consumption for each potential flight level for one segment and then taking a smallest estimated fuel consumption into account in order to estimate aircraft weight for a cost curve calculation for a downpath segment.

5. The method as recited in claim 1, wherein step (b) comprises:
   summing the cost of all level segments at each flight level between intersections; and
   for each intersection, calculating the cost to climb or descend between the two flight levels of the respective intersecting cost curves based on an aircraft performance model, the calculating comprising correcting the cost by subtracting a part of the cost for a level segment that is not flown, which part of the cost is proportional to a distance traveled during climbing or descending.

6. The method as recited in claim 5, wherein the level segments are represented as lateral edges in the weighted graph and the step segments are represented as vertical edges in the weighted graph.

7. The method as recited in claim 6, wherein step (c) comprises using a path finding algorithm to find lateral and vertical edges in the weighted graph which represent an optimal vertical profile.

8. The method as recited in claim 1, wherein steps (a) through (e) are performed periodically by a flight management computer during flight of the aircraft.

9. An electronic device for optimizing the vertical profile to be flown by an aircraft during a cruise phase of a flight, comprising a computer system configured to perform the following operations:
   (a) determining all potentially relevant step locations along potential cruise flight paths of the aircraft;
   (b) generating digital data representing a weighted graph, the weighted graph based on the cost of all level segments and step segments along the potential cruise flight paths, which step segments start at the respective step locations;
   (c) determining an optimized vertical profile by applying a path-finding algorithm to the weighted graph;
   (d) outputting step locations and altitudes of the optimized vertical profile;
   (e) generating a predicted trajectory to be flown along a route by the aircraft based on the step locations and altitudes of the optimized vertical profile; and
   (f) controlling the aircraft to fly in accordance with a portion of the predicted trajectory,
   wherein operation (a) comprises:
   calculating cost curves for segments of all potential flight levels in parallel, the cost curves of each segment based on an aircraft performance model; and
   determining all intersections between the cost curves.

10. The electronic device as recited in claim 9, wherein calculating cost curves comprises calculating an estimated fuel consumption for each potential flight level for one segment and then taking a smallest estimated fuel consumption into account in order to estimate aircraft weight for a cost curve calculation for a downpath segment.

11. The electronic device as recited in claim 9, wherein operation (b) comprises:
   summing the cost of all level segments at each flight level between intersections; and
   for each intersection, calculating the cost to climb or descend between the two flight levels of the respective intersecting cost curves based on an aircraft performance model.

12. The electronic device as recited in claim 11, wherein the level segments are represented as lateral edges in the weighted graph and the step segments are represented as vertical edges in the weighted graph.

13. The electronic device as recited in claim 12, wherein operation (c) comprises using a path finding algorithm to find lateral and vertical edges in the weighted graph which represent an optimal vertical profile.

14. The electronic device as recited in claim 9, wherein the computer system is further configured to repeat steps (a) through (e) during flight of the aircraft along the portion of the predicted trajectory to generate an updated predicted trajectory.

15. A system for optimizing the vertical profile to be flown by an aircraft during a cruise phase of a flight, comprising a cockpit graphical display system and a computer system configured to perform the following operations:
- (a) determining all potentially relevant step locations along potential cruise flight paths of the aircraft;
- (b) generating digital data representing a weighted graph, the weighted graph based on the cost of all level segments and step segments along the potential cruise flight paths, which step segments start at the respective step locations;
- (c) determining an optimized vertical profile by applying a path-finding algorithm to the weighted graph;
- (d) outputting step locations and altitudes of the an optimized vertical profile;
- (e) generating a predicted trajectory to be flown along a route by the aircraft based on the step locations and altitudes of the optimized vertical profile; and
- (f) controlling the cockpit graphical display system to display at least a portion of the optimized vertical profile corresponding to a portion of the route, wherein operation (a) comprises:

calculating cost curves for segments of all potential flight levels in parallel, the cost curves for each segment based on an aircraft performance model; and determining all intersections between the cost curves.

16. The system as recited in claim 15, wherein operation (b) comprises:

summing the cost of all level segments at each flight level between intersections; and for each intersection, calculating the cost to climb or descend between the two flight levels of the respective intersecting cost curves based on an aircraft performance model.

17. The system as recited in claim 16, wherein the level segments are represented as lateral edges in the weighted graph and the step segments are represented as vertical edges in the weighted graph.

18. The system as recited in claim 17, wherein operation (c) comprises using a path finding algorithm to find lateral and vertical edges in the weighted graph which represent an optimal vertical profile.

19. The system as recited in claim 15, wherein the computer system is further configured to repeat steps (a) through (e) during flight of the aircraft along the portion of the predicted trajectory to generate an updated predicted trajectory.

20. The system as recited in claim 15, wherein the computer system is further configured to control the aircraft to fly in accordance with a portion of the predicted trajectory.

* * * * *